(12) United States Patent
Jin et al.

(10) Patent No.: US 12,129,196 B2
(45) Date of Patent: Oct. 29, 2024

(54) SILICA REMOVAL REAGENT FOR REVERSE OSMOSIS MEMBRANE PRETREATMENT

(71) Applicant: ECOLAB USA Inc., St. Paul, MN (US)

(72) Inventors: Ning Jin, Shanghai (CN); Lingfeng Han, Shanghai (CN); Chunbo Yu, Shanghai (CN)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 17/434,507

(22) PCT Filed: Aug. 9, 2021

(86) PCT No.: PCT/CN2021/111590
§ 371 (c)(1),
(2) Date: Aug. 27, 2021

(87) PCT Pub. No.: WO2022/042284
PCT Pub. Date: Mar. 3, 2022

(65) Prior Publication Data
US 2023/0174401 A1 Jun. 8, 2023

(30) Foreign Application Priority Data
Aug. 31, 2020 (CN) .......................... 202010896874.5

(51) Int. Cl.
| | | |
|---|---|---|
| C02F 1/52 | (2023.01) | |
| C02F 1/44 | (2023.01) | |
| C02F 1/56 | (2023.01) | |
| C02F 5/08 | (2023.01) | |
| C02F 101/10 | (2006.01) | |

(52) U.S. Cl.
CPC ............... *C02F 5/08* (2013.01); *C02F 1/441* (2013.01); *C02F 1/5245* (2013.01); *C02F 1/56* (2013.01); *C02F 2101/10* (2013.01); *C02F 2303/22* (2013.01)

(58) Field of Classification Search
CPC .......... C02F 5/08; C02F 1/441; C02F 1/5245; C02F 1/56; C02F 2101/10; C02F 2303/22
See application file for complete search history.

(56) References Cited

U.S. PATENT DOCUMENTS

| | | | |
|---|---|---|---|
| 2,307,466 A | 1/1943 | Noll et al. | |
| 2,401,924 A | 6/1946 | Goetz | |
| 4,016,075 A | 4/1977 | Wilkins | |
| 4,276,180 A | 6/1981 | Matson | |
| 4,298,442 A | 11/1981 | Giuffrida | |
| 5,512,181 A | 4/1996 | Matchett | |
| 5,965,027 A | 10/1999 | Allen et al. | |
| 6,416,672 B1 | 7/2002 | Midkiff | |
| 6,428,705 B1 | 8/2002 | Allen et al. | |
| 7,597,144 B2 | 10/2009 | Minnich et al. | |
| 7,686,079 B2 | 3/2010 | Gamache et al. | |
| 7,815,804 B2 | 10/2010 | Nagghappan | |
| 8,734,650 B2 | 5/2014 | Bradley | |
| 9,180,411 B2 | 11/2015 | Prakash et al. | |
| 9,221,700 B2 | 12/2015 | Greene et al. | |
| 9,714,178 B2 | 7/2017 | Drake | |
| 9,914,653 B2 | 3/2018 | Eda et al. | |
| 10,392,283 B2 | 8/2019 | Fujiwara et al. | |
| 2013/0193077 A1 | 8/2013 | Chidambaran et al. | |
| 2016/0176739 A1 | 6/2016 | Ukai et al. | |
| 2018/0194642 A1 | 7/2018 | Ukai et al. | |

FOREIGN PATENT DOCUMENTS

| | | |
|---|---|---|
| CN | 101365766 A | 2/2009 |
| CN | 102583809 A | 7/2012 |
| CN | 102689999 A | 9/2012 |
| CN | 102689956 B | 9/2013 |
| CN | 104176870 A | 12/2014 |
| CN | 104843742 A | 8/2015 |
| CN | 104973717 A | 10/2015 |
| CN | 106277169 A | 1/2017 |
| CN | 107021554 A | 8/2017 |
| CN | 108059223 A | 5/2018 |
| CN | 108821406 A | 11/2018 |
| CN | 108862696 A | 11/2018 |
| CN | 109052604 A | 12/2018 |
| CN | 109422309 A | 3/2019 |
| EP | 2531450 B1 | 1/2016 |
| JP | S5916588 A | 1/1984 |
| JP | 2004122093 A | 4/2004 |
| JP | 2004141799 A | 5/2004 |
| JP | 6078379 B2 | 2/2017 |
| JP | 2019042646 A | 3/2019 |
| WO | 2019046897 A1 | 3/2019 |

OTHER PUBLICATIONS

Machine translation of CN102583809.*
Ho, Jia Shin et al., "Inline coagulation-ultrafiltration as the pretreatment for reverse osmosis brine treatment and recovery," Desalination 365 (2015), 242-249.
Pacheco Rodriguez, Rocio Idalia, Dissertation: Control of Silica Scaling Phenomena in Reverse osmosis Systems. University of Texas at Austin, May 2005, 220 pages.
Sheikholeslami, R. et al., "Silica and metals removal by pretreatment to prevent fouling of reverse osmosis membranes," Desalination 143 (2002), 255-267.
PCT International Search Report and Written Opinion for PCT/CN2021/111590, mailed Nov. 8, 2021, 9 pages.

* cited by examiner

*Primary Examiner* — Haidung D Nguyen
(74) *Attorney, Agent, or Firm* — Eric D. Babych; Barnes & Thornburg LLP

(57) ABSTRACT

A method of reducing silica fouling in an aqueous system is provided. The method includes adding a composition including a ferric salt and a magnesium salt to an aqueous medium to precipitate silica in the aqueous medium and form a precipitated silica. The method also includes removing at least a portion of the precipitated silica from the aqueous medium to form an aqueous supernatant.

18 Claims, No Drawings

SILICA REMOVAL REAGENT FOR REVERSE OSMOSIS MEMBRANE PRETREATMENT

BACKGROUND

1. Field of the Invention

This invention relates generally to removing silica from an aqueous medium. More specifically, this invention relates to a composition including a ferric salt and a magnesium salt for removing silica in an aqueous medium.

2. Description of the Related Art

In many parts of the world, amorphous silica scales cause significant fouling problems when industrial waters contain high quantities of silica. For the most part, high quantities of silica means that the industrial waters contain at least 5 ppm and up to about 500 ppm dissolved silica and may contain higher quantities of silica either in dissolved, colloidal, or particulate forms.

The solubility of silica adversely limits the efficient use of water in industrial applications, such as cooling, boiler, geothermal, reverse osmosis, and papermaking. Specifically, water treatment operations are limited because the solubility of silica at about 150 ppm can be exceeded when minerals are concentrated during processing. This excess can result in the precipitation and deposition of amorphous silica and silicates with consequential loss of equipment efficiency. Moreover, the accumulation of silica on internal surfaces of water treatment equipment, such as boilers, cooling, and purification systems, reduces heat transfer and fluid flow through heat exchange tubes and membranes.

Once the silica scale forms on water treatment equipment, the removal of such scale is very difficult and costly. With high silica water, therefore, cooling and reverse osmosis systems typically operate at low water-use efficiency to assure that the solubility of silica is not exceeded. Under these conditions, however, reverse osmosis systems must limit their pure water recovery rate and cooling systems must limit water recycling. In both cases, water discharge volumes are large.

Various additives have been employed over the years to inhibit silica deposition. The current technologies for silica scale control in industrial cooling systems involve the use of either colloidal silica dispersants or silica polymerization inhibitors. Unlike common scales/deposit such as calcium carbonate and calcium phosphate, silica polymerization can only be slowed and cannot be fully stopped if its concentration is significantly above supersaturation levels. Therefore, there are certain limits for silica dispersants/antiscalants. The maximum tolerated dissolved silica level is typically around 200-400 ppm.

Silica fouling is often the main bottleneck for high recovery reverse osmosis systems. For zero liquid discharge (ZLD) or near ZLD processes, silica concentration can reach levels significantly higher than the dispersants/antiscalants limits. Membranes severely fouled by silica are very difficult to clean and almost impossible to fully recover. Thus, it is often necessary to reduce silica concentration in membrane influent.

BRIEF SUMMARY

A method of reducing silica fouling in an aqueous system is provided. The method includes adding a composition comprising a ferric salt and a magnesium salt to an aqueous medium to precipitate silica in the aqueous medium and form a precipitated silica. The method also includes removing at least a portion of the precipitated silica from the aqueous medium to form an aqueous supernatant.

In some aspects, the ferric salt is ferric chloride, ferric chloride hydrates, polyferric chloride, ferric sulfate, polyferric sulfate, or a combination thereof.

In some aspects, the magnesium salt is magnesium oxide, magnesium chloride, magnesium chloride hexahydrate, magnesium sulfate, magnesium sulfate monohydrate, magnesium sulfate heptahydrate, magnesium carbonate, or a combination thereof.

In some aspects, the magnesium salt is an anhydrous magnesium salt.

In some aspects, the magnesium salt is magnesium chloride and the ferric salt is ferric chloride.

In some aspects, the magnesium salt is magnesium sulfate and the ferric salt is polyferric sulfate.

In some aspects, the composition is prepared by mixing the ferric salt and the magnesium salt before adding to the aqueous medium.

In some aspects, the composition is added to the aqueous medium in an amount ranging from about 10 ppm to about 2,000 ppm.

In some aspects, the method includes adding a polyacrylamide based flocculant to the aqueous medium.

In some aspects, the polyacrylamide-based flocculant is added in an amount of about 0.05 ppm to about 5 ppm.

In some aspects, the aqueous medium has a pH of about 9.5 to about 12.5.

In some aspects, the method includes adding an aluminum compound to the aqueous medium.

In some aspects, the method includes feeding the aqueous supernatant into a filtration system followed by a reverse osmosis system.

In some aspects, the aqueous medium has a conductivity of about 100 µs/cm to about 100,000 µs/cm and a silica concentration of about 30 mg/L to about 250 mg/L, the aqueous medium comprising an antiscalant.

In some aspects, the aqueous medium has a temperature of about 10° C. to about 100° C.

In some aspects, the aqueous medium has a total hardness of about 0 mg/L to about 2,000 mg/L as $CaCO_3$.

In some aspects, the method includes stirring the aqueous medium after adding the composition.

In some aspects, the method includes adding a base after adding the composition.

In some aspects, the base is an alkali metal hydroxide.

In other aspects, a use of a composition comprising a ferric salt and a magnesium salt for removing silica from an aqueous medium is provided.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

DETAILED DESCRIPTION

The relationship and functioning of the various elements of the embodiments may better be understood by reference to the following detailed description.

A method of reducing silica fouling in an aqueous system is provided. The method includes adding a composition comprising a ferric salt and a magnesium salt to an aqueous medium to precipitate silica in the aqueous medium and form a precipitated silica. The method also includes removing at least a portion of the precipitated silica from the aqueous medium to form an aqueous supernatant.

The composition added to the aqueous medium includes a ferric salt. Examples of ferric salts include, but are not limited to, ferric chloride ($FeCl_3$), ferric chloride hydrates, polyferric chloride, ferric sulfate, or polyferric sulfate. In some aspects, the ferric salt is ferric chloride. In some aspects, the ferric salt is a ferric chloride hydrate. In some aspects, the ferric salt is a ferric sulfate. In some aspects, the ferric salt is a polyferric chloride. In some aspects, the ferric salt is a polyferric sulfate.

The ferric salt may be anhydrous or a hydrate. Examples of ferric salt hydrates include, but are not limited to, hexahydrate, pentahydrate, and dihydrates. For example, iron chloride may be a hexahydrate, a pentahydrate, a dihydrate, or other hydrate.

The composition added to the aqueous medium includes a magnesium salt. Examples of the magnesium salt include, but are not limited to, a magnesium oxide, magnesium chloride, magnesium chloride hexahydrate, magnesium sulfate, magnesium sulfate monohydrate, magnesium sulfate heptahydrate, or magnesium carbonate. In some aspects, the magnesium salt is a magnesium oxide. In some aspects, the magnesium salt is a magnesium chloride. In some aspects, the magnesium salt is magnesium chloride hexahydrate. In some aspects, the magnesium salt is magnesium sulfate. In some aspects, the magnesium salt is magnesium sulfate monohydrate. In some aspects, the magnesium salt is magnesium sulfate heptahydrate. In some aspects, the magnesium salt is magnesium carbonate.

The magnesium salt may be anhydrous or a hydrate. In some aspects, the magnesium salt is an anhydrous magnesium salt such as anhydrous magnesium chloride, for example.

In some aspects, the composition is prepared by mixing the ferric salt and the magnesium salt before adding to the aqueous medium. The mixing may include combining a powder of the magnesium salt with a powder of the ferric salt. Pre-mixing the ferric and magnesium salts together enhances silica and hardness removal in a synergistic manner.

In some aspects, the weight ratio of the magnesium salt to the ferric salt is about 0.1:1 to about 10:1. In some aspects, the weight ratio of the magnesium salt to the ferric salt is about 4:1, about 2:1, about 3:1, about 5:1, or about 6:1.

Without being bound by any particular theory, it is believed that there are two mechanisms for silica removal by magnesium salts. Most magnesium precipitates as magnesium hydroxide, which absorbs silica in solution. Some of the magnesium can co-precipitate with silica forming magnesium silicate directly. The co-precipitation mechanism enables magnesium salts to remove silica more efficiently than silica absorption by magnesium hydroxide. By pre-mixing magnesium and acidic ferric salts and dosing them together, it is believed that the ferric salts protect magnesium from rapid precipitation to magnesium hydroxide, thus enhancing the overall silica removal efficiency.

The composition may be added to the aqueous medium in an effective amount sufficient to precipitate silica from the solution. In some aspects, the composition is added to the aqueous medium in an amount ranging from about 10 ppm to about 2,000 ppm.

In some aspects, the amount of composition added to the aqueous medium is about 10 ppm to about 1,000 ppm, from about 50 ppm to about 500 ppm, or from about 100 ppm to about 400 ppm. In some aspects, the amount of the composition added is about 100 ppm, about 200 ppm, about 300 ppm, or about 400 ppm.

The method may further include adding a polyacrylamide-based flocculant to the aqueous medium. In some aspects, the polyacrylamide-based flocculant is an anionic polyacrylamide. The polyacrylamide-based flocculant can be added separately. The flocculant can be added after adding the composition to the aqueous medium. The polyacrylamide-based flocculant may be added in an amount of about 0.05 ppm to about 5 ppm.

In some aspects, the method optionally includes adding an aluminum compound to the aqueous medium. The aluminum compound may be polyaluminum chloride or other aluminum salt.

The method may further include adding a base to the aqueous medium after adding the composition to adjust pH to optimal levels. In some aspects, the base is an alkali metal hydroxide. Examples of alkali metal hydroxides include sodium hydroxide and lime. The method may further include adding a softening reagent to reduce hardness levels. A typical softening reagent is sodium carbonate (soda ash), for example. One of ordinary skill in the art could select a suitable base and a suitable softening agent depending on the needs of the system.

After adding the composition to the aqueous medium, the aqueous medium may be stirred or mixed to disperse the composition throughout the medium. The means for stirring the medium is not limited to any particular structure or technique. One of ordinary skill in the art could select a suitable mixing means depending on the needs of the system.

The aqueous medium that can be treated is not particularly limited, but it was discovered that the composition containing a ferric salt and a magnesium salt synergistically removed silica from wastewater. To reclaim the wastewater, further purification measures are applied such as filtration and ion exchange. Filtration methods include multimedia filtration, microfiltration, and ultrafiltration among others. Ion exchange methods are applied to further reduce hardness levels. In some aspects, the method includes feeding the aqueous supernatant into a filtration system followed by ion exchange system, and then a reverse osmosis system after adding the composition.

For high recovery reverse osmosis systems, silica can be removed as a precipitate in the softening process, which is mainly used to reduce raw water hardness. During softening, the water is typically treated by a combination of lime, caustic soda, and soda ash. Calcium is precipitated as calcium carbonate, and magnesium as magnesium hydroxide. Silica can be precipitated with magnesium forming magnesium silicate, and to a much lesser extent, with calcium forming calcium silicate. Other reagents such as aluminum and ferric based coagulants and polyacrylamide-based flocculants are also added to enhance sedimentation of the precipitate.

The magnesium concentration in influent water is often much lower than the required amount for satisfactory silica removal. Thus, it is a common practice to add an additional magnesium source in influent water to enhance silica removal. Magnesium oxide, magnesium chloride, magnesium sulfate, magnesium carbonate and dolomitic lime are commercially available as magnesium sources, and magnesium oxide is the most commonly used.

The compositions disclosed herein are particularly effective for removing silica from an aqueous medium having a pH of about 9.5 to about 12.5. In some aspects, the pH of the aqueous medium may be about 10.0 to about 11.5.

In some aspects, the aqueous medium has a conductivity of about 100 µs/cm to about 100,000 µs/cm. In some aspects, the aqueous medium has a conductivity of about 100 µs/cm to about 300,000 µs/cm, about 100 µs/cm to about 10,000 µs/cm, or about 5,000 µs/cm to about 10,000 µs/cm.

The hardness of the aqueous medium may be measured in mg/L as $CaCO_3$. In some aspects, the aqueous medium has a total hardness of about 0 mg/L to about 2,000 mg/L as $CaCO_3$. In some aspects, the hardness of the aqueous medium may be from about 50 mg/L as $CaCO_3$ to about 1,500 mg/L as $CaCO_3$. In some aspects, the hardness of the aqueous medium may be from about 10 mg/L as $CaCO_3$ to about 600 mg/L as $CaCO_3$. In some aspects, the hardness of the aqueous medium may be from about 200 mg/L as $CaCO_3$ to about 500 mg/L as $CaCO_3$.

The silica concentration in the aqueous medium before treatment with the compositions disclosed herein may be from about 30 mg/L to about 250 mg/L. In some aspects, the silica concentration in the aqueous medium may be from about 50 mg/L to about 250 mg/L. In some aspects, the silica concentration in the aqueous medium may be from about 60 mg/L to about 250 mg/L.

The silica is present as dissolved, silicic species, silicates, or their complex ions and may also be present as colloidal silica or suspended silica. The higher the concentration of total silica from all sources in these waters, the more difficult is the problem created by amorphous silica scale formation.

In some aspects, the aqueous medium has a temperature of about 10° C. to about 50° C. In some aspects, the temperature of the aqueous medium may be from about 20° C. to about 40° C.

In water pre-treatment for high recovery reverse osmosis systems, wastewater influent often contains antiscalants. The antiscalants may be added in upstream cooling water treatment and/or reverse osmosis processes to prevent scaling and deposit in these processes. Unfortunately, antiscalants interfere with the downstream softening and silica removal process, resulting in higher operational pH and higher chemicals usage.

Without being bound by any particular theory, by premixing magnesium and ferric salts and dosing them together, the freshly precipitated ferric hydroxide efficiently binds antiscalants and removes their negative effects. As a result, hardness and silica removal efficiency increases.

Although not required to implement this invention, it is contemplated that the compositions disclosed herein may be combined with one or more corrosion inhibitors, one or more other scale inhibitors, one or more fluorescent tracers, or one or more water treatment polymers.

It should be appreciated that the method, in certain embodiments, may be combined with other utilities known in the industry. Representative utilities include sensors for measuring the content of various additives in the system; dissolved or particulate contaminant sensors; other sensors based upon resistance, capacitance, spectroscopic absorbance or transmittance, colorimetric measurements, and fluorescence; and mathematical tools for analyzing sensor/controller results (e.g., multivariate analysis, chemometrics, on/off dosage control, PID dosage control, the like, and combinations thereof).

In another embodiment, an inert fluorescent tracer is included in the synergistic blend to provide a means of determining the dosage level. A known proportion of the fluorescent tracer is added either simultaneously or sequentially with the blend. Effective inert fluorescent tracers include those substances that are chemically non-reactive with other components in the system and that do not significantly degrade with time. Such tracers should also be completely (or essentially completely) soluble in the blend at all relevant levels of concentration and preferably the fluorescence intensity should be substantially proportional to its concentration and not significantly quenched or otherwise diminished by other components in the system. Furthermore, the inert fluorescent tracer should not be appreciably or significantly affected by any other chemistry in the system. The statement, "not appreciably or significantly affected," means that an inert fluorescent compound generally has no more than about a 10% change in its fluorescent signal, under conditions normally encountered in fuel ethanol.

Desired characteristics for an inert fluorescent tracer preferably include: fluorescence excitation/emission wavelengths that do not have significant overlap with light absorbing substances present in the water of the system, other additives, contaminants, etc.; high solubility; excellent chemical stability; suitable fluorescence properties at manageable wavelengths (e.g., other components in the system should not interfere with the fluorescence properties at those wavelengths) and excitation/emission wavelengths that are separate from other fluorescent components that may be present in the system to prevent interference; and avoiding negative impacts on the properties of the system.

Representative inert fluorescent tracers include fluorescein or fluorescein derivatives; rhodamine or rhodamine derivatives; naphthalene sulfonic acids (mono-, di-, tri-, etc.); pyrene sulfonic acids (mono-, di-, tri-, tetra-, etc.); stilbene derivatives containing sulfonic acids (including optical brighteners); biphenyl sulfonic acids; phenylalanine; tryptophan; tyrosine; vitamin B2 (riboflavin); vitamin B6 (pyridoxin); vitamin E (α-tocopherols); ethoxyquin; caffeine; vanillin; naphthalene sulfonic acid formaldehyde condensation polymers; phenyl sulfonic acid formaldehyde condensates; lignin sulfonic acids; polycyclic aromatic hydrocarbons; aromatic (poly)cyclic hydrocarbons containing amine, phenol, sulfonic acid, carboxylic acid functionalities in any combination; (poly)heterocyclic aromatic hydrocarbons having N, O, or S; a polymer containing at least one of the following moieties: naphthalene sulfonic acids, pyrene sulfonic acids, biphenyl sulfonic acids, or stilbene sulfonic acids.

Representative scale inhibitors include, but are not limited to, inorganic and organic polyphosphate, phosphonates, and polycarboxylates. These inhibitors help inhibit or disperse other scales such as calcium carbonate, calcium sulfate, calcium phosphate, calcium fluoride, barium sulfate, calcium oxalate, and the like.

Examples

Example 1: Anhydrous magnesium chloride and ferric chloride were mixed together with a weight ratio of about 4:1 as a fine powder. They were added to a wastewater sample from a coal to chemical plant. The wastewater sample had the following characteristics: pH of about 9.21, conductivity of about 212,000 µs/cm, SiO$_2$ concentration of about 90.5 mg/L, total hardness of about 450 mg/L as CaCO$_3$, calcium hardness of about 290 mg/L as CaCO$_3$, and total alkalinity of about 710 mg/L as CaCO$_3$. The wastewater contained an unknown amount of antiscalants from upstream reverse osmosis and cooling water treatment. Temperature was set at about 21° C. Wastewater solution pH was pre-adjusted using a fixed amount of NaOH, and then either the pre-mixed salts were added via a 10 wt % solution with a total powder dosage of about 200 ppm, or the components were added separately via 10 wt % solutions of respective salts with an interval of about 1 min. The solution was allowed to stir for an additional 10 minutes after all the chemicals were added. Then, an anionic polyacrylamide solution was added with a dosage of about 0.5 ppm, the solution was stirred for an additional minute and then allowed to sediment for about 60 minutes. The final solution had a pH of about 11.0, and a supernatant sample was taken out for analysis. The analytical results are shown in Table 1.

TABLE 1

|  | Unit | Pre-mix | Mg first, then Fe | Fe First, then Mg |
|---|---|---|---|---|
| SiO$_2$ | mg/L | 59.1 | 64.1 | 66.3 |
| Total Hardness | mg/L CaCO$_3$ | 119 | 131 | 142 |
| Ca Hardness | mg/L CaCO$_3$ | 73 | 65 | 63 |
| Turbidity | NTU | 4.3 | 5.7 | 9.5 |
| Total Iron | mg/L | 0.05 | 0.07 | 0.12 |

Example 2: Anhydrous magnesium sulfate and polyferric sulfate were mixed together with a weight ratio of about 1:1 as a fine powder. They were added to a wastewater sample from a coal to chemical plant. The wastewater sample had the following characteristics: pH of about 9.64, conductivity of about 8440 µs/cm, SiO$_2$ concentration of about 64.3 mg/L, total hardness of about 247 mg/L as CaCO$_3$, calcium hardness of about 217 mg/L as CaCO$_3$, and total alkalinity of about 730 mg/L as CaCO$_3$. The wastewater was mainly from cooling water blowdown and contained an unknown amount of antiscalants. The temperature was set at about 27° C. Either the premixed salts were added via a 10 wt % solution with a total powder dosage of about 200 ppm, or the components were added separately via 10 wt % solutions of respective salts with an interval of about 1 minute. After addition of the salts, a 30 wt % NaOH solution was added dropwise to allow the pH of the solution to increase to about 11.3, the pH adjusting took about 0.5 minutes. Then the solution was allowed to stir for an additional 10 minutes, an anionic polyacrylamide solution was added with a dosage of about 0.5 ppm, the solution continued to stir for an additional 1 minute and then allowed to sediment for about 60 minutes. The final solution pH was about 10.90, and a supernatant sample was taken out for analysis. The analytical results are shown in Table 2.

TABLE 2

|  | Unit | Pre-mix | Mg first, then Fe | Fe First, then Mg |
|---|---|---|---|---|
| SiO$_2$ | mg/L | 39.1 | 41.1 | 45.5 |
| Total Hardness | mg/L CaCO$_3$ | 72 | 71 | 114 |
| Ca Hardness | mg/L CaCO$_3$ | 57 | 55 | 52 |
| Turbidity | NTU | 1.6 | 1.8 | 2.4 |
| Total Iron | mg/L | 0.03 | 0.03 | 0.04 |

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a ferric salt" is intended to include "at least one ferric salt" or "one or more ferric salts."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Any composition disclosed herein may comprise, consist of, or consist essentially of any element, component and/or ingredient disclosed herein or any combination of two or more of the elements, components or ingredients disclosed herein.

Any method disclosed herein may comprise, consist of, or consist essentially of any method step disclosed herein or any combination of two or more of the method steps disclosed herein.

The transitional phrase "comprising," which is synonymous with "including," "containing," or "characterized by," is inclusive or open-ended and does not exclude additional, un-recited elements, components, ingredients and/or method steps.

The transitional phrase "consisting of" excludes any element, component, ingredient, and/or method step not specified in the claim.

The transitional phrase "consisting essentially of" limits the scope of a claim to the specified elements, components, ingredients and/or steps, as well as those that do not materially affect the basic and novel characteristic(s) of the claimed invention.

Unless specified otherwise, all molecular weights referred to herein are weight average molecular weights and all viscosities were measured at 25° C. with neat (not diluted) polymers.

As used herein, the term "about" refers to the cited value being within the errors arising from the standard deviation found in their respective testing measurements, and if those errors cannot be determined, then "about" may refer to, for example, within 5% of the cited value.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A method of reducing silica fouling in an aqueous system, comprising:
   mixing a ferric salt with a magnesium salt to form a composition before adding the composition to an aqueous medium, wherein the weight ratio of the magnesium salt to the ferric salt is about 2:1 to about 6:1;
   adding the composition to the aqueous medium to precipitate silica in the aqueous medium and form a precipitated silica; and
   removing at least a portion of the precipitated silica from the aqueous medium to form an aqueous supernatant.

2. The method of claim 1, wherein the ferric salt is ferric chloride, ferric chloride hydrates, polyferric chloride, ferric sulfate, polyferric sulfate, or a combination thereof.

3. The method of claim 1, wherein the magnesium salt is magnesium oxide, magnesium chloride, magnesium chloride hexahydrate, magnesium sulfate, magnesium sulfate monohydrate, magnesium sulfate heptahydrate, magnesium carbonate, or a combination thereof.

4. The method of claim 1, wherein the magnesium salt is an anhydrous magnesium salt.

5. The method of claim 1, wherein the magnesium salt is magnesium chloride and the ferric salt is ferric chloride.

6. The method of claim 1, wherein the magnesium salt is magnesium sulfate and the ferric salt is polyferric sulfate.

7. The method of claim 1, wherein the composition is added to the aqueous medium in an amount ranging from about 10 ppm to about 2,000 ppm.

8. The method of claim 1, further comprising adding a polyacrylamide-based flocculant to the aqueous medium.

9. The method of claim 8, wherein the polyacrylamide based flocculant is added in an amount of about 0.05 ppm to about 5 ppm.

10. The method of claim 1, wherein the aqueous medium has a pH of about 9.5 to about 12.5.

11. The method of claim 1, further comprising adding an aluminum compound to the aqueous medium.

12. The method of claim 1, further comprising feeding the aqueous supernatant into a filtration system followed by a reverse osmosis system.

13. The method of claim 1, wherein the aqueous medium has a conductivity of about 100 µs/cm to about 100,000 µs/cm and a silica concentration of about 30 mg/L to about 250 mg/L, and the aqueous medium further comprises an antiscalant.

14. The method of claim 1, wherein the aqueous medium has a temperature of about 10° C. to about 50° C.

15. The method of claim 1, wherein the aqueous medium has a total hardness of about 0 mg/L to about 2,000 mg/L as $CaCO_3$.

16. The method of claim 1, further comprising stirring the aqueous medium after adding the composition.

17. The method of claim 1, further comprising adding a base after adding the composition.

18. The method of claim 17, wherein the base is an alkali metal hydroxide.

* * * * *